(12) United States Patent
Krebs

(10) Patent No.: US 9,973,267 B2
(45) Date of Patent: *May 15, 2018

(54) SATELLITE CONSTELLATION

(71) Applicant: Google Inc., Mountain View, CA (US)

(72) Inventor: Mark Krebs, Niwot, CO (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/268,121

(22) Filed: Sep. 16, 2016

(65) Prior Publication Data
US 2017/0005719 A1    Jan. 5, 2017

Related U.S. Application Data

(63) Continuation of application No. 14/510,859, filed on Sep. 30, 2014, now Pat. No. 9,647,749.

(51) Int. Cl.
H04B 7/185 (2006.01)
H04B 7/19 (2006.01)

(52) U.S. Cl.
CPC ..... H04B 7/18521 (2013.01); H04B 7/18584 (2013.01); H04B 7/19 (2013.01)

(58) Field of Classification Search
None
See application file for complete search history.

(56) References Cited

U.S. PATENT DOCUMENTS

| | | | |
|---|---|---|---|
| 5,099,235 A | 3/1992 | Crookshanks | |
| 5,619,211 A * | 4/1997 | Horkin | H04B 7/18508 342/352 |
| 5,666,648 A * | 9/1997 | Stuart | H04B 7/195 342/352 |
| 5,813,634 A | 9/1998 | Pizzicaroli et al. | |
| 5,971,324 A * | 10/1999 | Williams | B64G 1/1007 244/158.4 |
| 6,122,596 A * | 9/2000 | Castiel | B64G 1/1007 244/158.4 |
| 6,499,698 B2 * | 12/2002 | Maeda | B64G 1/1007 244/158.4 |
| 6,511,020 B2 * | 1/2003 | Higgins | B64G 1/1007 244/158.4 |
| 6,571,102 B1 * | 5/2003 | Hogberg | H04B 7/18563 370/329 |

(Continued)

FOREIGN PATENT DOCUMENTS

| | | |
|---|---|---|
| EP | 1035663 A2 | 9/2000 |
| WO | WO-2007058721 A1 | 5/2007 |

*Primary Examiner* — Tuan A Tran
(74) *Attorney, Agent, or Firm* — Honigman Miller Schwartz and Cohn LLP

(57) ABSTRACT

A communication system includes a constellation of communication devices orbiting the earth. Each communication device has a corresponding orbital path or trajectory with an inclination angle of less than 90 degrees and greater than zero degrees with respect to the equator of the earth. The constellation includes a first group of communication devices orbiting at a first altitude from the earth and at a first inclination angle. The constellation also includes a second group of communication devices orbiting at a second altitude from the earth lower than the first altitude and at a second inclination angle different from the first inclination angle.

20 Claims, 9 Drawing Sheets

(56) References Cited

U.S. PATENT DOCUMENTS

| | | | |
|---|---|---|---|
| 6,609,002 B1 * | 8/2003 | Krishnamurthy, Sr. | ................... H04B 7/1856 455/12.1 |
| 6,684,056 B1 * | 1/2004 | Emmons, Jr. | ............ H04B 7/19 455/12.1 |
| 6,807,158 B2 * | 10/2004 | Krishnamurthy, Sr. | ................... H04B 7/18563 370/316 |
| 6,866,231 B2 * | 3/2005 | Higgins | ................ B64G 1/1007 244/158.4 |
| 6,868,316 B1 * | 3/2005 | Stevens | ................ G05D 1/0883 244/171 |
| 6,985,454 B1 | 1/2006 | Wiedeman et al. | |
| 7,370,566 B2 * | 5/2008 | Furman | ................ B64G 1/1085 244/158.4 |
| 2007/0284482 A1 * | 12/2007 | Furman | ................... F41H 11/02 244/158.4 |
| 2011/0058515 A1 * | 3/2011 | Shahab | ............. H04B 7/18534 370/316 |
| 2013/0154874 A1 | 6/2013 | Burr | |
| 2014/0341586 A1 * | 11/2014 | Wyler | ................ H04B 7/18521 398/115 |

* cited by examiner

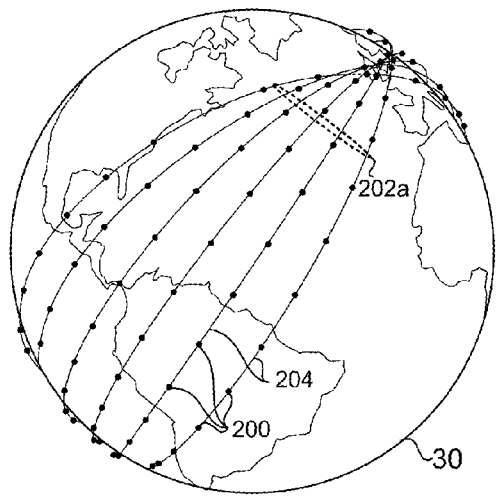
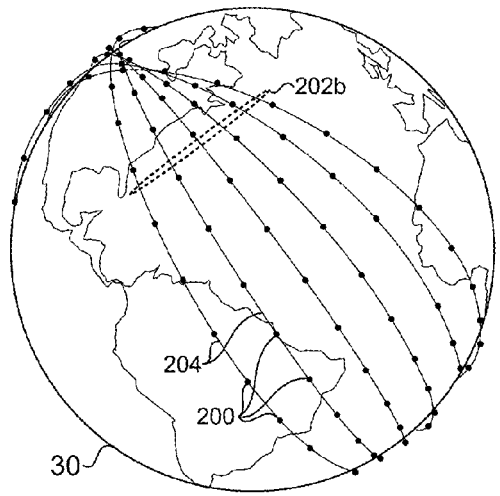
FIG. 2A      FIG. 2B
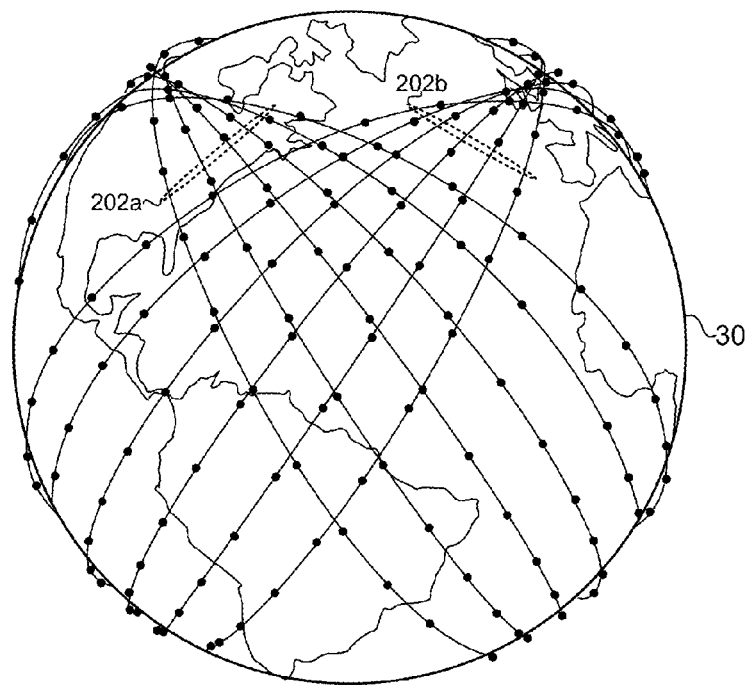
FIG. 2C

SATELLITE CONSTELLATION

CROSS REFERENCE TO RELATED APPLICATIONS

This U.S. patent application is a continuation of, and claims priority under 35 U.S.C. § 120 from, U.S. patent application Ser. No. 14/501,859, filed on Sep. 30, 2014, which is hereby incorporated by reference in its entirety.

TECHNICAL FIELD

This disclosure relates to a satellite constellation having satellites orbiting the earth.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites can provide communication services to areas where wired cables cannot reach. Satellites may be geostationary or non-geostationary. Geostationary satellites remain permanently in the same area of the sky as viewed from a specific location on earth, because the satellites are orbiting the equator with an orbital period of exactly one day. Non-geostationary satellites typically operate in low- or mid-earth orbit, and do not remain stationary relative to a fixed point on earth. The orbital path of a satellite can be described in part by the plane intersecting the center of the earth and containing the orbit. Each satellite may be equipped with communication devices called inter-satellite links (or, more generally, inter-device links) to communicate with other satellites in the same plane or in other planes. The communication devices allow the satellites to communicate with other satellites. In addition, the communication devices significantly increase the cost of building, launching and operating each satellite and increase the weight of the satellite. They also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure.

SUMMARY

One aspect of the disclosure provides a communication system including a constellation of communication devices (e.g., satellites) orbiting the earth. Each communication device has a corresponding orbital path or trajectory with an inclination angle of less than 90 degrees and greater than zero degrees with respect to the equator of the earth. The constellation further includes a first group of communication devices orbiting at a first altitude from the earth and at a first inclination angle and a second group of communication devices orbiting at a second altitude from the earth lower than the first altitude and at a second inclination angle different from the first inclination angle.

Implementations of the disclosure may include one or more of the following optional features. Groups of communication devices may provide overlapping coverage of portions of the earth.

In some examples, one group of communication devices orbits the earth at an inclination angle equal to about 60 degrees. Additionally or alternatively, the communication devices within an orbital path or trajectory may be separated by equal distances. The system may further include a source ground station in communication with a communication device of at least one group of communication devices and a destination ground station in communication with a communication device of at least one group of communication devices.

A current communication device having possession of a communication may be in communication with a forward communication device and a rearward communication device. The forward communication device and the rearward communication device may be within the same orbital path or trajectory as the current communication device.

The communication system may further include a data processing device in communication with the source ground station, the constellation of communication devices and the destination ground station. The data processing device may determine a routing path of a communication from a source in communication with the source ground station to a destination in communication with the destination ground station. Additionally or alternatively, the data processing device may determine the routing path based on at least one of a border gateway protocol, an interior gateway protocol, maximum flow algorithm, or shortest path algorithm. In some implementations, the data processing device determines the routing path based on a scoring function of one or more of a distance between the source and the destination, a capacity of an inter-satellite link between two devices, an operational status of a communication device, and a signal strength of a communication device. The operational status of a communication device may include an active status or an inactive status of the communication device as a whole or one or more individual components of the communication device.

The first group of communication devices and the second group of communication devices may be arranged to provide at least 75% coverage of the earth at any given time. Moreover, one or more communication devices may have a rectangular or hexagonal coverage footprint of the earth.

Another aspect of the disclosure provides a method of communication. The method includes determining, at a data processing device, a routing path of a communication from a source ground station to a destination ground station through a constellation of communication devices orbiting the earth. Each communication device has a corresponding orbital path or trajectory with an inclination angle of less than 90 degrees and greater than zero degrees with respect to the equator of the earth. The constellation includes a first group of communication devices orbiting at a first altitude from the earth and at a first inclination angle and a second group of communication devices orbiting at a second altitude from the earth lower than the first altitude and at a second inclination angle different from the first inclination angle. The method further includes instructing, using the data processing device, the source ground station to send the communication to the destination ground station through one or more communication devices of the constellation of communication devices in communication with one another.

In some implementations, the method includes instructing the source ground station to send the communication to a first communication device in the first group of communication devices. The method further includes instructing the first communication device in the first group of communication devices to send the communication to a second communication device in the first group of communication devices or a third communication device in the second group of communication devices.

The first group of communication devices and the second group of communication devices may be arranged to provide at least 75% coverage of the earth at any given time. Moreover, one or more communication devices may have a rectangular or hexagonal coverage footprint of the earth.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A is a schematic view of an exemplary first groups of satellites of the global-scale communication system.

FIG. 2B is a schematic view of an exemplary second groups of satellites of the global-scale communication system.

FIG. 2C is a schematic view of the exemplary first and second groups of satellites of the global-scale communication system of FIGS. 2A and 2B.

Like reference symbols in the various drawings indicate like elements.

DETAILED DESCRIPTION

Figure 1A:
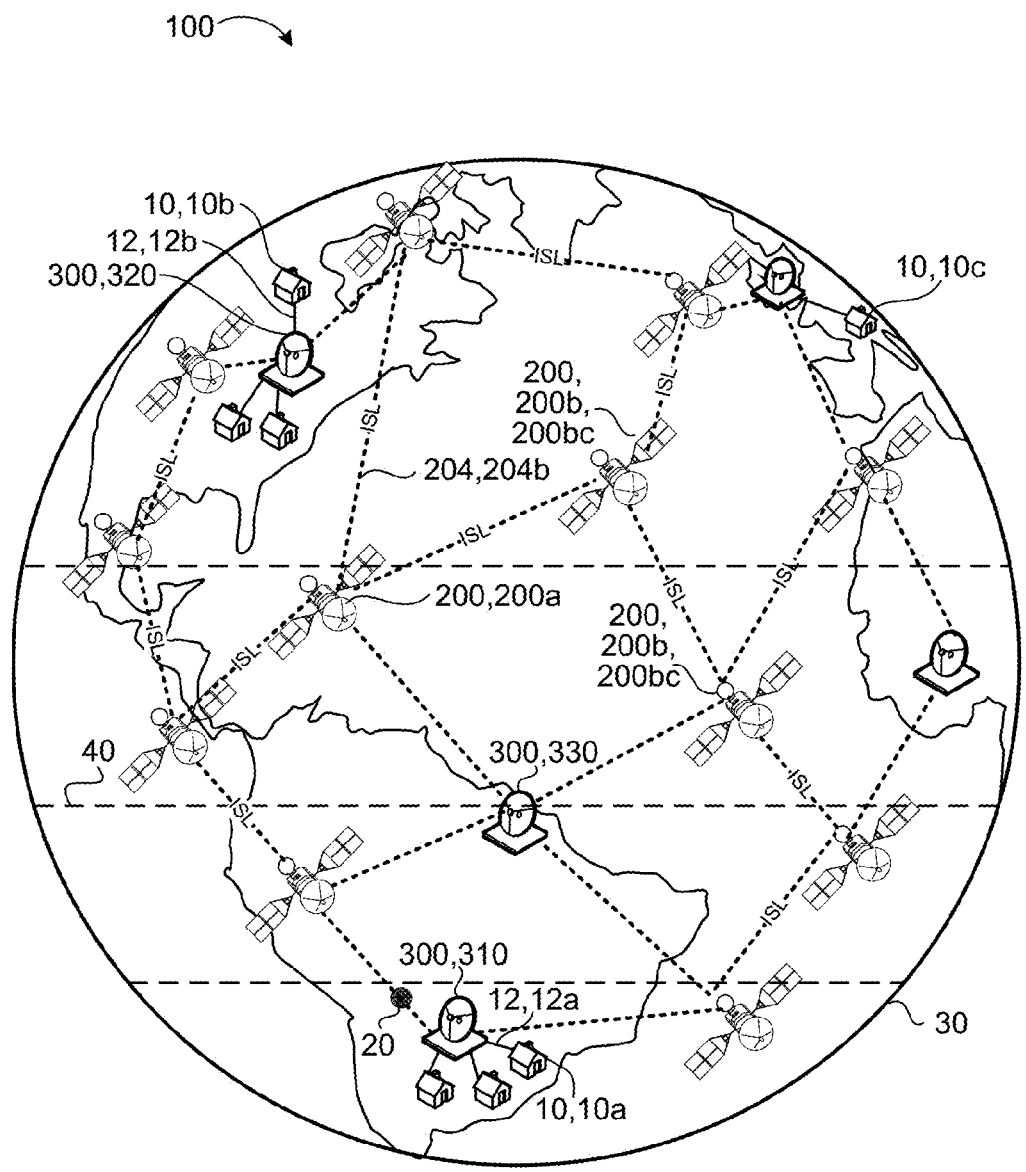
FIG. 1A is schematic view of an exemplary global-scale communication system with satellites.
Figure 1B:
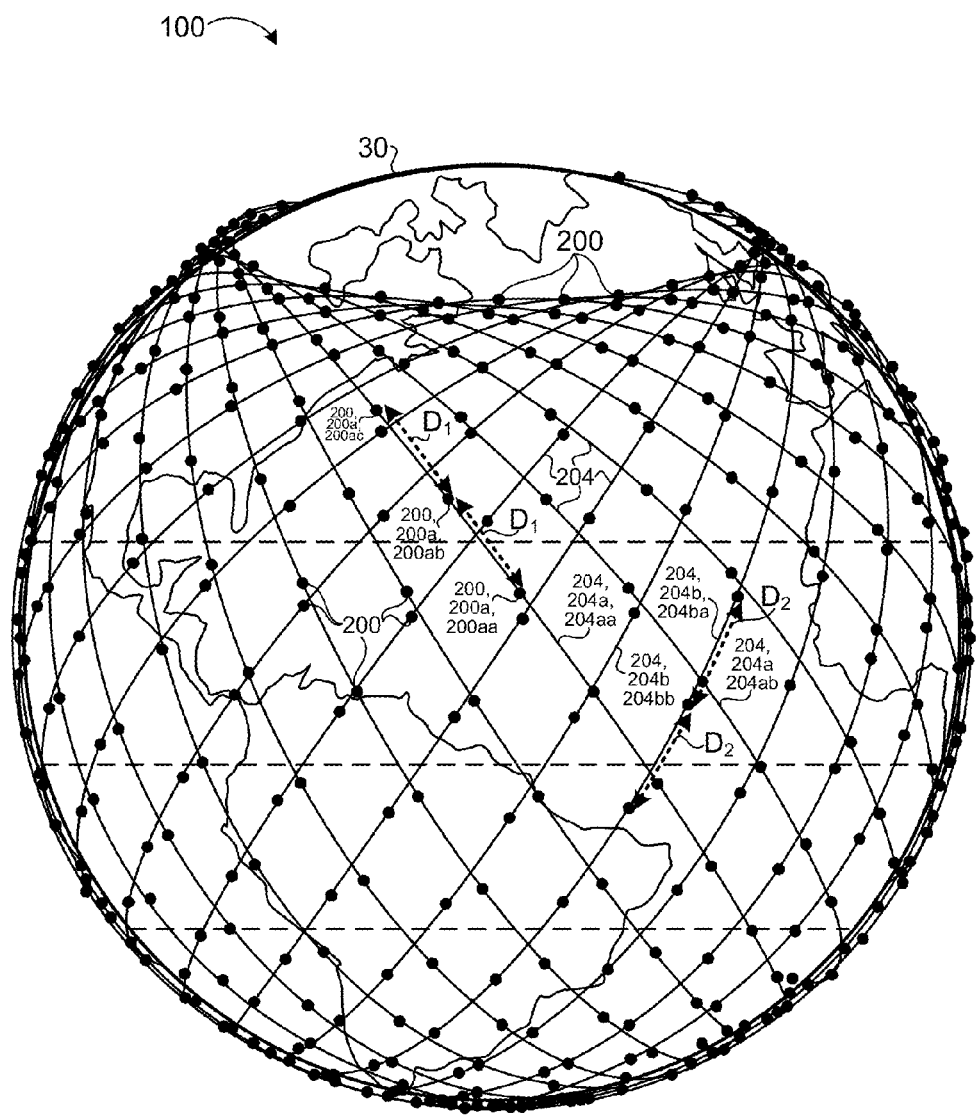
FIG. 1B is schematic view of exemplary orbital paths or trajectories of the satellites of FIG. 1A.

Referring to FIGS. 1A-1B, in some implementations, a global-scale communication system 100 includes satellites 200, gateways 300 (including source ground stations 310, destination ground stations 320, and optionally linking-gateways 330), and a system data processing device 110. In some examples, the source ground stations 310 and/or the destination ground stations 320 are user terminals or gateways 300 connected to one or more user terminals. A satellite 200 may orbit the earth 30 in Low Earth Orbit (LEO) or Medium Earth Orbit (MEO) or High Earth Orbit (HEO), including Geosynchronous Earth Orbit (GEO). The satellite 200 includes an antenna 207 that receives a communication 20 from a source ground station 310 and reroutes the communication signal to a destination ground station 320. The satellite 200 also includes a data processing device 210 that processes the received communication 20 and determines a path of the communication 20 to arrive at the destination ground station 320. Additionally, the global-scale communication system 100 includes multiple ground stations 300, such as a source ground station 310, a destination ground station 320, and optionally a linking-gateway 330. The source ground station 310 is in communication with a first user 10a through a cabled, a fiber optic, or a wireless radio-frequency connection 12a, and the destination ground station 320 is in communication with the second user 10b through a cabled, a fiber optic, or a wireless radio-frequency connection 12b. In some examples, the communication 20 between the source ground station 310 and the first user 10a or the communication 20 between the destination ground station 320 and the second user 10b is a wireless communication 20 (either radio-frequency or free-space optical).

A satellite 200 is an object placed into orbit around the earth 30 and may serve different purposes, such as military or civilian observation satellites, communication satellites, navigations satellites, weather satellites, and research satellites. The orbit of the satellite 200 varies depending in part on the purpose that the satellite 200 is being used for. Satellite orbits 202 may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth 30) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

Due to the size of the earth 30, a large number of satellites 200 are utilized to provide signal coverage to the populated world. Satellites 200 may have an orbital path or trajectory 204 at about a 90 degree inclination angle with respect to the equator of the earth 30, but at a 90 degree inclination angle, the satellites 200 provide coverage to non-populated areas, such as the north and south poles. It is desirable to provide a communication system that increases the satellite signal coverage of the populated world, reduces satellite collision between satellites 200 as they orbit the earth 30, reduce the number of satellites 200 in the global-scale communication system 100, and provide overlapping coverage to maintain satellite coverage of a portion of the earth 30 when one of the satellites 200 covering the same portion is experiencing a malfunction.

Multiple satellites 200 working in concert form a satellite constellation. The satellites 200 within the satellite constellation may be coordinated to operate together and overlap in ground coverage to avoid communication downtime when a satellite 200 is experiencing problems (e.g., mechanical, electrical, or communication). Two common types of constellations are the polar constellation and the Walker constellation, both designed to provide maximum earth coverage while using a minimum number of satellites 200b. The polar constellation includes satellites 200 arranged in a polar constellation that covers the entire earth 30 and orbits the poles (e.g., the North and South poles), while the Walker constellation includes satellites 200 that cover areas below certain latitudes, which provides a larger number of satellites 200 simultaneously in view of a user 10 on the ground (leading to higher availability, fewer dropped connections).

As shown in FIGS. 1A and 1B, a first user 10a may communicate with the second user 10b or a third user 10c. Since each user 10 is in a different location separated by an ocean or large distances, a communication 20 is transmitted from the first user 10a through the global-scale communication system 100 to reach its final destination, i.e., the second or third users 10b, 10c. Therefore, it is desirable to have a global-scale communication system 100 capable of routing communication signal traffic over long distances, where one user location is in a location far from a source or destination ground station 310, 320 (e.g., ocean). It is also desirable to provide reduced latency of the system 100 and enhanced security due to the use of the satellites 200, as compared to fiber or cable-based communications. Moreover, it is desirable to have a cost effective system. As will be discussed later, a global-scale communication system 100 capable of being readily connected and provide connectivity of satellites 200 with fewer and simpler inter-satellite links per satellite 200 is also desirable. Lastly, it is desirable to have a global-communication system 100 capable of reducing the number of satellites 200 of the global communication system 100 while providing overlapping coverage of the populated areas (to compensate for any satellite 200 undergoing problems).

Referring to FIGS. 2A-3B, the satellites 200 of the global-scale communication system 100 are divided into one or more groups 202, each group 202 includes one or more satellites 200. In some examples, each group 202 includes one or more orbital paths or trajectories 204 where each orbital path or trajectory 204 includes multiple satellites 200 spaced from one another. The satellites 200 within an orbit 204 may be separated from one another by an equal distance D1, D2. In some examples, the global-scale communication system 100 includes a first group 202a of satellites 200 and a second group 202b of satellites 200. The first group 202a of satellites 200 orbit the earth 30 at a first altitude $A_1$; while the second group 202b of satellites 200 orbit the earth 30 at a second altitude $A_2$. The first altitude $A_1$ is greater than the second altitude $A_2$. In some examples, where the global-scale communication system 100 includes three or more groups 202 of satellites 200, a third group has a third altitude less than the second altitude, a fourth group has a fourth altitude less than the third altitude, and so forth. The satellites 200 may be orbiting the earth 30 within the LEO orbit, i.e., below 2,000 km (e.g., 1,300 km).

Launching the first group 202a of satellites 200a at a higher first altitude $A_1$ allows the global-scale communication system 100 to have fewer satellites 200 at the first altitude $A_1$ since the higher a satellite 200 is, the larger coverage area the satellite 200 covers. Following the first group 202a of satellites 200a launched at the first altitude $A_1$, the second group 202b of satellites 200b is launched and includes a larger number of satellites 200b, providing a bigger system bandwidth and supporting an increase number of users using the global scale communication system 100. Referring to FIG. 3B, the coverage area $C_1$ of a first satellite 200aa of the first group 202a of satellites 200a is greater that the coverage area $C_2$ of a second satellite 200bc of a second group 202b of satellites 200b. The first coverage area $C_1$ is greater than the second coverage area $C_2$ because of the higher altitude of the first satellite 200aa.

In some examples, an inclination angle of the first group 202a of satellites 200a is different than an inclination angle of the second group 200b of satellites 200b. The second group 202b of satellites 200b provides an overlapping coverage to the coverage provided by the first group of satellites 200. The orbits 204 within a group 202 of satellites 200 may have an equal number of satellites 200 or an unequal number of satellites 200. In some examples, the inclination angle (e.g., 60 degree angle) prevents the satellite 200 from undergoing any pitch maneuvers to increase its coverage area.

The overlapping coverage caused by the satellites 200a of the first group 202a and the satellites 200b of the second group 202b, as shown in FIG. 3B, (e.g., shown by a first satellite 200aa of the first group 200a and two other satellites 200ba, 200bb of the second group 202b) allows the satellites 200 to share power across the constellation 100, thus reducing the battery power needed for each satellite 200. Moreover, maintaining a constant inclination angle eliminates the need for an inter-satellite gimbal. A gimbal is a pivoted support that allows the rotation of an object about a single axis, and is usually used to keep an object upright with respect to another when the object is pitching and rolling.

Power flux density (PDF) is a measure of the power that is spread evenly across a sphere having a radius from an antenna 207 (of a satellite 200), per unit area of that sphere. The PDF depends on a total transmitted power of the signal. Therefore, due to an overlapping coverage of the earth 30, the PDF per satellite 200 is decreased due to sharing of power between the satellites 200.

In some implementations, the system 100 includes coverage gaps for a short duration, such as transitory coverage gaps, which may reduce the quality of service (QOS) of the signals, but also reduces the total number of satellites 200 covering the populated earth 30.

Squint is the angle that the transmission of the satellite 200 is offset from the normal of the plane of the antenna 207 of the satellite 200. In some examples, the squint angle of the satellites 200 is 45 degrees or less, e.g., 37 degrees.

The system data processing device 110 may be any one of the data processing devices 210 of the satellites 200, the data processing device 110 of any of the gateways 300, another data processing device in communication with the satellites 200 and gateways, or a combination thereof.

The first group 202a of satellites 200a and the second group 202b of satellites 200b may be arranged to provide at least 75% coverage of the earth at any given time. Moreover, one or more satellites 200 may have a rectangular or hexagonal coverage footprint of the earth. The hexagonal coverage footprint may allow for the fewest satellites 200. For example, 29 satellites 200 in 29 planes/orbits 204 results in a total of 841 satellites 200 for a 45 degree squint at an altitude of 925 kilometers. A higher altitude reduces the squint and satellite count. For example, at an altitude of 1300 kilometers, the communication system 100 may include 32×32 (32 satellites 200 in 32 planes/orbits 204), resulting in a total of 1024 satellites 200 for a 35 degree squint. In some examples, the communication system 100 employs rectangular coverage pattern and may include 29×42 (29 satellites 200 in 42 planes/orbits 204), resulting in a total of 1218 satellites 200 for a 45 degree squint. This arrangement is insensitive to true anomaly phasing, by being flexible for inserting spare satellites 200 and allowing control of conjunction misses.

The ubiquitous double coverage of the earth caused by the satellites 200a of the first group 202a and the satellites 200b of the second group 202b allows for outages of satellites 200 (individual spacecraft failures), power sharing throughout the constellation of satellites 200, and multiple LOS opportunities for every ground-space link, offering an ability to de-conflict from "keep away" lines of sight (e.g., to Geo-synchronous Satellites). The double coverage of satellites 200 also allows maximum utilization of the individual spacecraft's' footprints, with enhanced (more) overlap over populous areas, synchrony throughout the constellation, for predictable and safe conjunction miss distances at the orbit intersections, and low spacecraft count without recourse to polar inclinations that unnecessarily provide coverage of unpopulated arctic regions.

Figure 4:
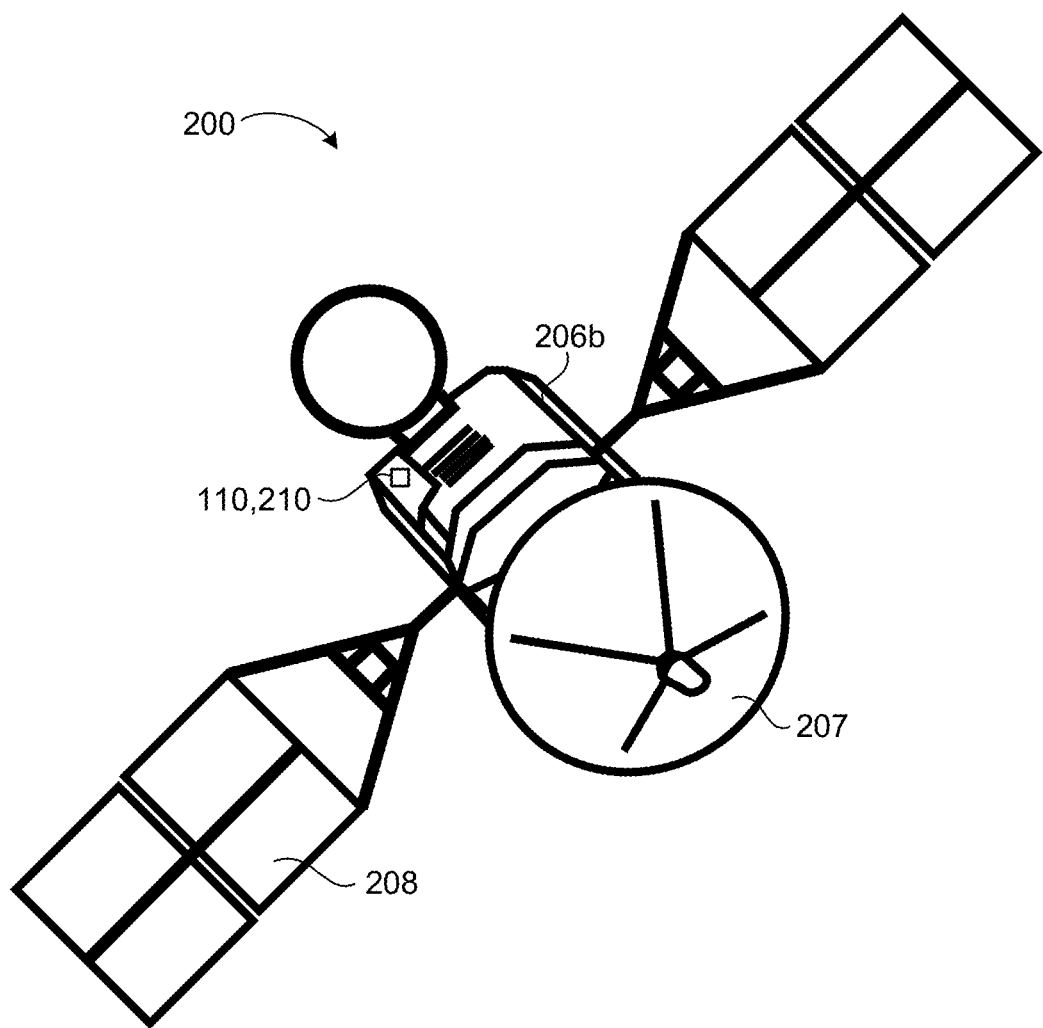
FIG. 4 is a perspective view of a satellite used in the exemplary global-scale communication system of satellites.

Referring to FIG. 4, a satellite 200 includes a satellite body 206 having a data processing device 210. The data processing device 210 executes algorithms to determine where the satellite 200 is heading. The satellite 200 also includes an antenna 207 for receiving and transmitting a communication 20. The satellite 200 includes solar panels 208 mounted on the satellite body 206. The solar panels 208 provide power to the satellite 200. In some examples, the satellite 200 includes rechargeable batteries used when sunlight is not reaching and charging the solar panels 208.

Communication security can be a major concern when building a communication network that allows different users 10 to communicate over long distances and especially continents. A communication signal being transmitted via a cable may be intercepted and the information being communicated may be retrieved. In some examples, fiber optics cables can be tapped for interception of communications using special tapping equipment. Interception of an optical fiber allows for the retrieval of all voice and data communications transmitted through the fiber cable, which in most instances may not be detected. The fiber may also be deliberately or accidentally cut or damaged, interrupting communications. Therefore, to avoid or minimize data interception or interruption, the global-scale communication system 100 limits or in some cases eliminates the use of fiber cables, providing a more secure signal trafficking. For example, the use of fiber optic cables is limited to relatively short distances from the source and destination ground stations 310, 320 to the user 10. The global-communication network 100 provides overlapping coverage of portions of the earth 30 to avoid situations where one satellite 200, providing coverage to a first area, is experiencing problems that prevents the satellite 200 from receiving or transferring a communication to a user 10 located in that first area (as shown and described with respect to FIG. 3B). Therefore, another satellite 200 covering the same area is capable of transmitting the communication 20 to the user 10, without having to route the communication 20 so that it is transferred via cables, if available.

Referring back to FIGS. 1-3B, when constructing a global-scale communications system 100 from multiple satellites 200, it is sometimes desirable to route traffic over long distances through the system 100 by linking one satellite 200 to another. For example, two satellites 200 may communicate via inter-satellite links. Such inter-satellite linking (ISL) is useful to provide communication services to areas far from source and destination ground stations 310, 320 and may also reduce latency and enhance security (fiber optic cables 12 may be intercepted and data going through the cable may be retrieved). This type of inter-satellite communication is different than the "bent-pipe" model, in which all the signal traffic goes from a ground-base gateway 310, 320 to a satellite 200b, and then directly down to a user 10 on earth 30 or vice versa. The "bent-pipe" model does not include any inter-device communications; instead, the satellite 200b acts as a repeater. In some examples of "bent-pipe" models, the signal received by the satellite 200b is amplified before it is re-transmitted; however, no signal processing occurs. In other examples of the "bent-pipe" model, part or all of the signal may be processed and decoded to allow for one or more of routing to different beams, error correction, or quality-of-service control; however no inter-satellite communication occurs.

In some implementations, satellites 200 within the same plane 204 maintain the same position relative to their intra-plane satellite 200 neighbors. However, the position of a satellite 200 relative to neighbors in an adjacent plane 202 (within the same group 202 or a different group) varies over time. For example, referring back to FIG. 1B, the large-scale satellite constellation 100 includes a first group 202a of satellites 200a positioned about one or more orbital paths 204a and a second group 202b of satellites 200b positioned about one or more orbital paths 204b. A satellite distance $D_1$ between a first satellite 200aa of a first orbital path 204aa and a second satellite 200ab of the same orbital path 204aa is the same as the distance $D_t$ between the second satellite 200ab of the first orbital path 204aa and a third satellite 200ac of the first orbital path 204aa. The same applies for the distances between the satellites 200b of any orbital path (e.g., a second distance $D_2$ between satellites 200b of an orbital path 204b within the second group 204b of satellites 200b). Thus, satellites 200 within the same plane 204 (which corresponds roughly to a specific latitude, at a given point in time) maintain a roughly constant position relative to their intra-plane neighbors (i.e., a forward and a rearward satellite 200), but their position relative to neighbors in an adjacent plane varies over time.

Inter-satellite link (ISL) eliminates or reduces the number of satellite 200 to gateway hops, which decreases the latency and increases the overall network capabilities. Inter-satellite links allow for communication traffic from one satellite 200 covering a particular region to be seamlessly handed over to another satellite 200 covering the same region, where a first satellite 200 is leaving the first area and a second satellite 200 is entering the area.

In some implementations, a satellite constellation includes satellites 200 having enough inter-satellite links to make the constellation fully-connected, where each satellite 200 is equipped with communication equipment and additional antennas 207 to track the location of other satellites 200 in the same plane 202 or in other adjacent planes 202 in order to communicate with the other satellites 200b.

In some examples, an additional antenna 207 of a current satellite 200 is capable of tracking any other satellite 200 within the view of the current satellite 200. Thus the additional antenna 207 tracks other satellites 200 in a different orbit and/or group of satellites 200. This increases the cost of the satellite 200, since it adds additional hardware (e.g., the additional antennas) and computations for the satellite 200 to track satellites 200 in other planes 202 whose position is constantly changing.

In other examples, and to maintain the simplicity and low cost of design, construction, and launch of the system 100, the system 100 includes a satellite 200 that only tracks a first satellite 200 in front or forward of it and another satellite 200 behind it or rearward of it and uses linking-gateways 330 to link a communication 20 from one plane 204 to another. In this case, and to achieve a fully-connected system 100, the system 100 includes linking-gateways 330 that receive a communication 20 from a satellite 200 and send the communication 20 to another satellite 200 in a different plane 204.

Figure 3A:
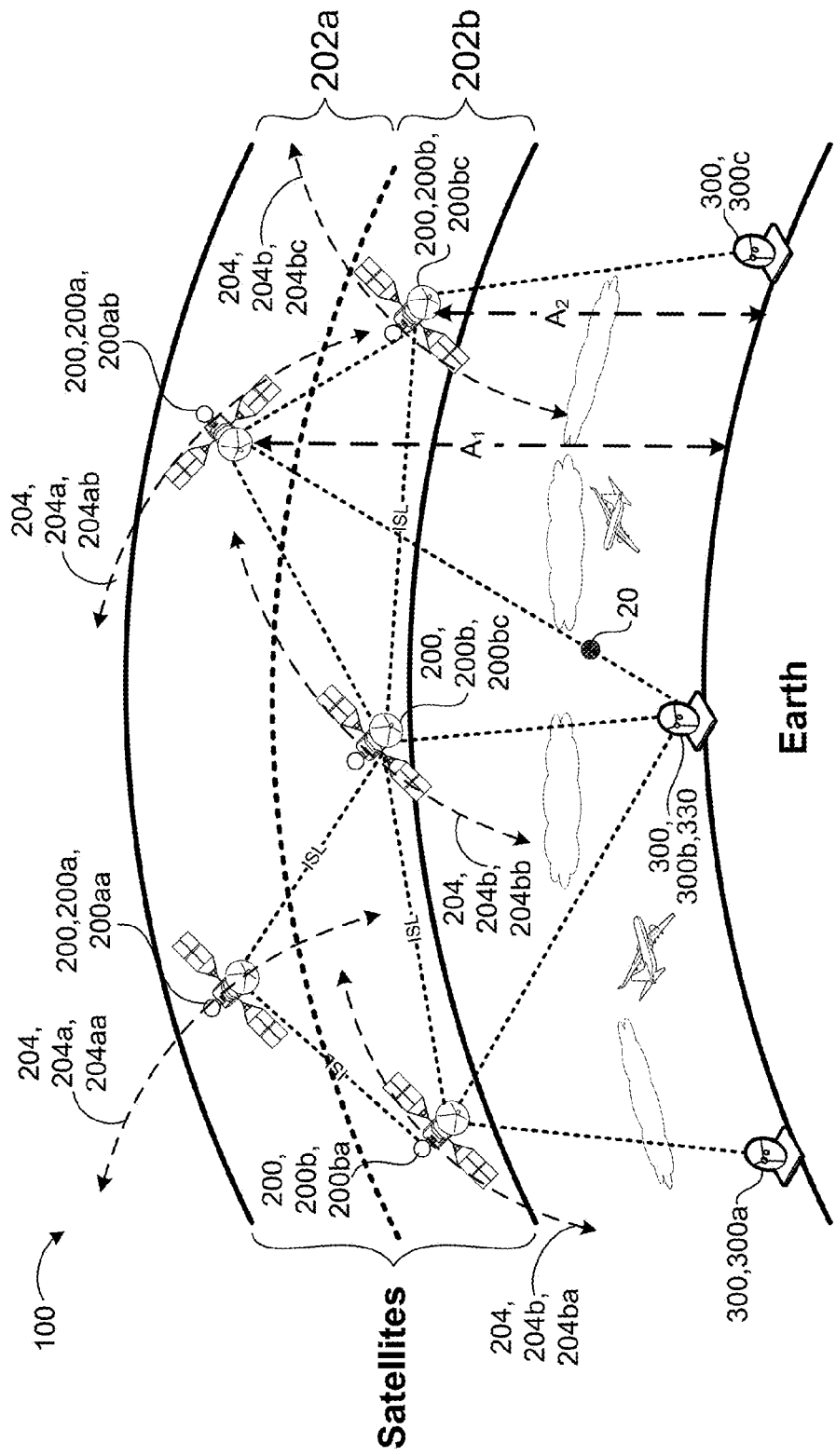
FIG. 3A is a schematic view of an exemplary path between satellites of different groups where each group is at a different altitude.
Figure 3B:
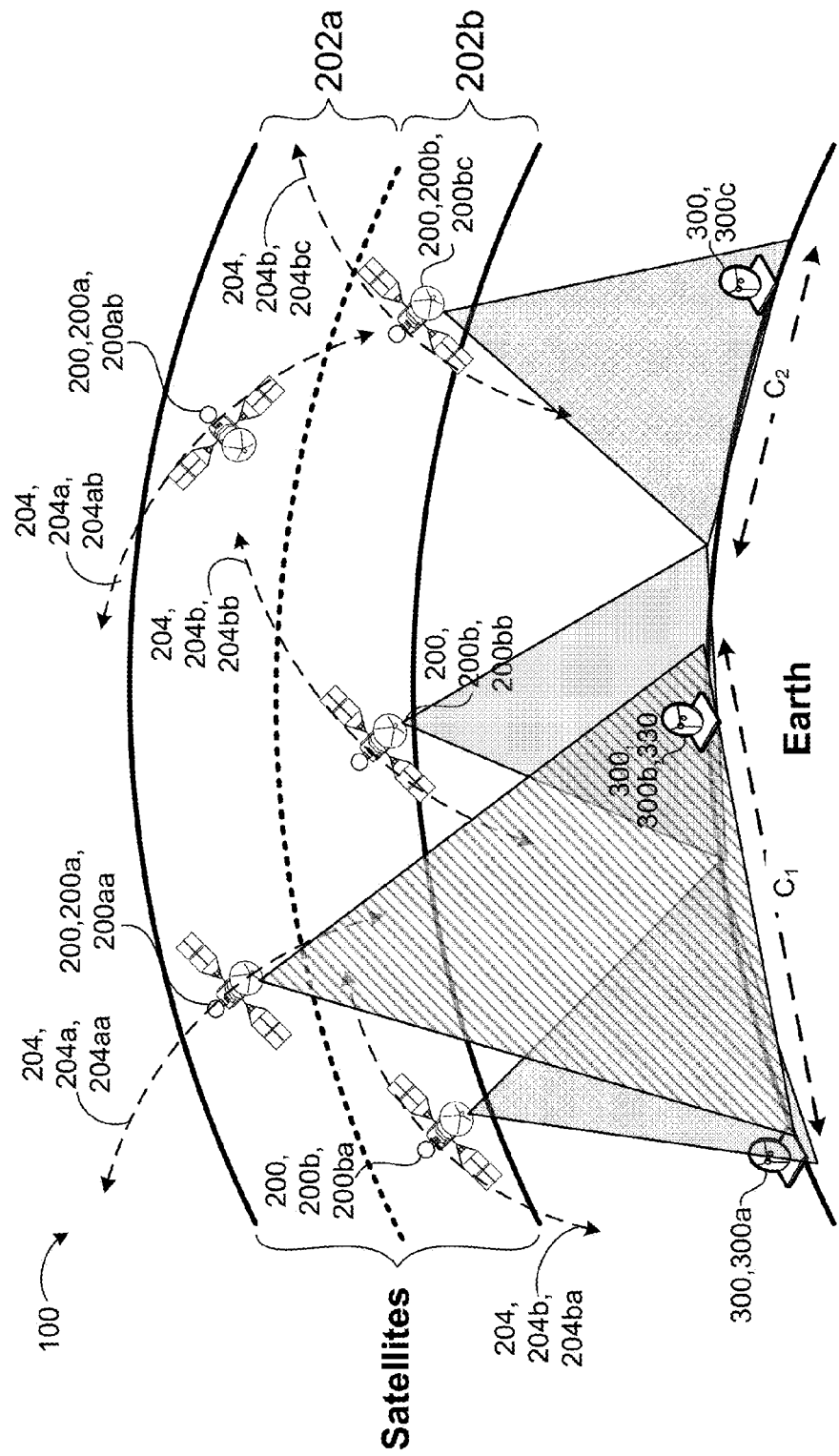
FIG. 3B is a schematic view of an exemplary earth coverage between satellites of different groups where each group is at a different altitude.

As shown in FIGS. 3A and 3B, a linking-gateway 330 may connect two satellites 200, each being in a different group 202a, 202b. The linking-gateway 330 receives the communication 20 from the first group 202a of satellites 200 and sends the communication 20 to the second group 202b of satellites 200. Moreover, the linking-gateway 330 may receive a communication 20 from a satellite 200 within a group 202a, 202b and send the communication 20 to another satellite 200 within the same group 202a, 202b.

In some examples, a first satellite 200a orbiting a plane 204a of the first group 202a receives a communication 20 from a source ground station 310 and sends the communication 20 to a second satellite 200b orbiting a plane 204b of the second group 202b which in turn sends the communication to a destination ground station 320. This set-up provides a fully-connected satellite constellation at a lower price and with less complexity than the current satellites 200 that have complex algorithms to track multiple other satellites 200, which means a signal from one satellite 200 can be sent to any other satellite 200 within the constellation. For example, within a plane 204, each satellite 200 can link with a forward satellite 200 located in front of the current satellite 200, and a backward satellite 200 located rearward the current satellite 200. This reduces the number of links of each satellite 200 to other satellites 200, thus reducing the cost of additional equipment needed for tracking more than one satellite 200.

As shown, in some implementations, to increase coverage of the populated earth 30, each plane 204 has an inclination with respect to the equator 40 of the earth of greater than 0 and less or equal to 60 degrees. Additionally, all the orbits 204 within a group 202 may have an equal inclination. For example, if a first orbit 204aa of a first group 202a has a first inclination of 60 degrees with respect to the equator 40, then any other orbit 204a within the same group 202a has an inclination of 60 degrees with respect to the equator 40 of the earth 30. Therefore, the lower inclination of the orbits 204 (as opposed to polar orbits) decreases the number of satellites 200 to about half (e.g., as compared to a polar constellation) since the constellation is only covering the populated portion of the world and avoiding wasted coverage of the non-populated areas, such as the north and south poles. Moreover, due to the decrease of the number of satellites 200, which is a cost savings, an additional cost savings is a reduction in the cost of launching the satellites 200.

A ground station 300 is usually used as a connector between satellites 200 and the internet, or between satellites 200 and user terminals 10. However, the system 100 utilizes the gateways 300 as linking-gateways 330 for relaying a communication 20 from one satellite 200 to another satellite 200, where each satellite is in a different group 202 or plane 204. Each linking-gateway 330 receives a communication 20 from an orbiting satellite 200, processes the communication 20 and switches the communication 20 to another satellite 200 in a different group 202 or plane 204. Therefore, the combination of the satellite 200 and the linking-gateways 330 provide a fully-connected system 100 when using the linking-gateways 330 to fill the gap reducing the number of antennas of each satellite 200, which track other satellite devices that are within another group 202 or plane 204 of the current satellite 200.

Figure 5:
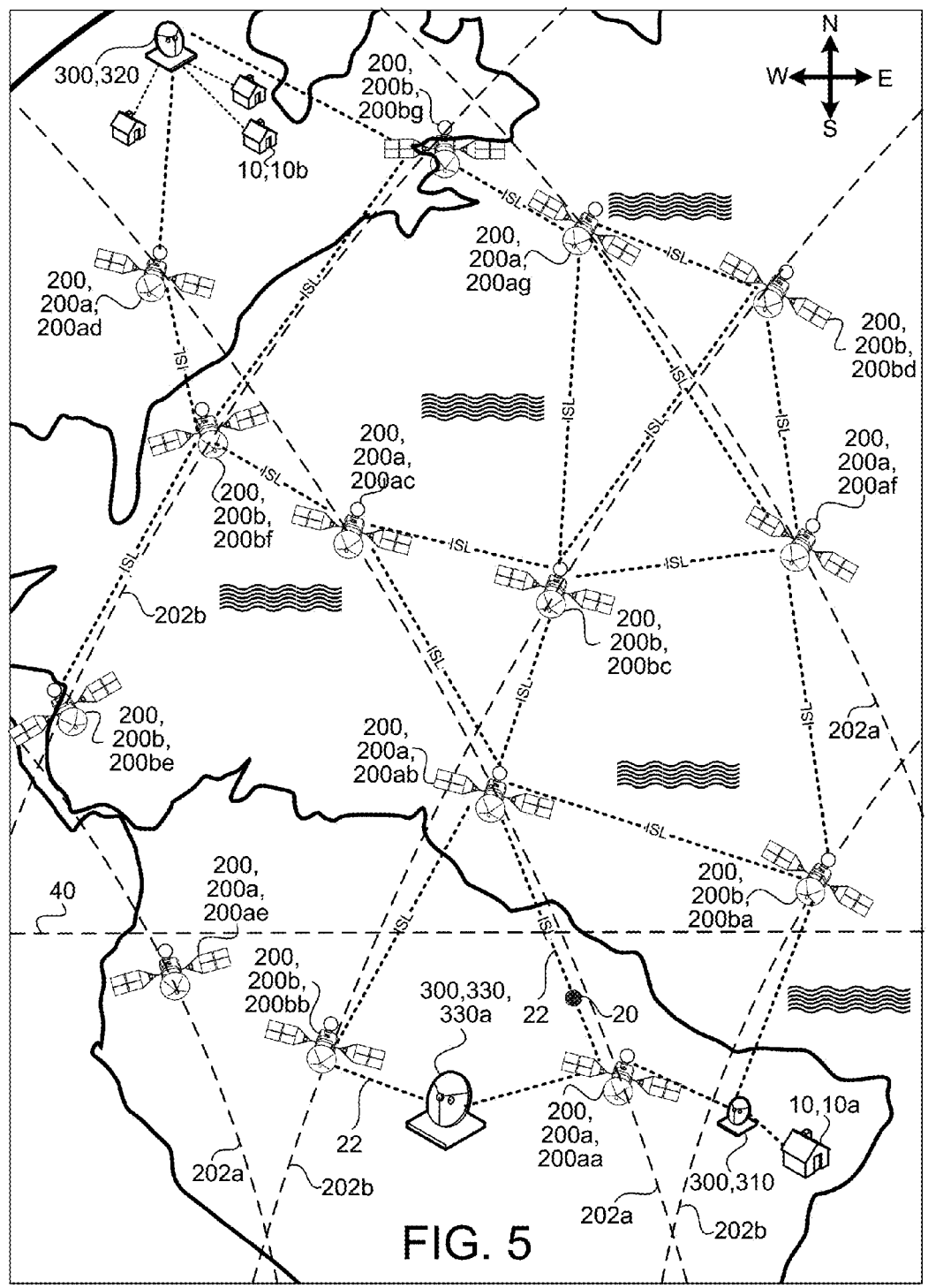
FIG. 5 is a schematic view of an exemplary path between satellites for sending a communication between a first user and a second user in a global-scale communication system cupboard

FIG. 5 provides an example of communication paths 22 from a first user 10a to a second user 10b. In some examples, a first user 10a in Brazil wants to communicate with a second user 10b in the U.S.A. The first user 10a sends a communication 20 to the second user 10b. The global-scale communication system 100 receives the communication 20 at a source ground station 310 and determines (using the system data processor 110) a path 22 leading to the destination ground station 320. In some examples, the source ground station 310 receives the communication 20 from the first user 10a through a cabled or fiber optic connection 12. In other examples, the source ground station 310 receives the communication 20 through a wireless radio-frequency communication. Similarly, the destination ground station 320 may transmit the communication 20 to the second user 10b through cables or fiber optic connection 12, or through a wireless radio-frequency communication. Other examples are possible as well, such as free-space optical communications or combinations of free-space optical, cabled, wireless radio-frequency, and fiber optic communications between users 10 and gateways 300 (e.g., source and destination ground stations 310, 320). Moreover, a user 10 may be in a house, a residential building, a commercial building, a data center, a computing facility, or a service provider. In some examples, the source ground station 310 and/or the destination ground station 320 connects to one or more users 10. Moreover, a user 10 may be a source ground station 310 or a destination ground station 320.

When the system 100 receives the communication 20, the system data processing device 110, 210 determines the routing path 22 of the communication 20 based on one or more criterions. In some implementations, the system data processing device 110, 210 considers, but is not limited to, border gateway protocol (which includes routing algorithms), interior gateway protocol, maximum flow problem, and/or shortest path problem.

The border gateway protocol (BGP) is an exterior gateway protocol used to exchange routing and reachability information between autonomous systems on the internet. The protocol is classified as either a path vector protocol or a distance vector routing protocol. The path routing protocol is a computer routing protocol for maintaining the path information (of a communication 20) that gets updated dynamically. The path routing protocol is different from the distance vector routing protocol in that each entry in its routing table includes a destination network (e.g., destination ground station 320 or end user 10b), the next router (e.g., the next satellite 200), and the path 22 to reach the destination ground station 320. The distance vector routing protocol requires that a router (e.g., satellite 200 or linking-gateway 330) informs its neighbors (e.g., HA satellite CD 200 or linking-gateway 330) of topology changes periodically. When the system 100 uses the distance vector routing protocol, the system 100 considers the direction in which each communication 20 should be forwarded, and the distance from its destination (current position). The system data processing device 110 calculates the direction and the distance to any other satellite 200 in the system 100. Direction is the measure of the cost to reach the next destination; therefore, the shortest distance between two nodes (e.g., satellites 200, gateways 300) is the minimum distance. The routing table of the distance vector protocol of a current device (e.g., satellite 200 or gateway 300) is periodically updated and may be sent to neighboring devices. BGP does not utilize Interior Gateway Protocol (IGP).

Interior gateway protocol (IGP) may be used for exchanging routing information between gateways (e.g., satellites 200 or linking-gateways 330) within an autonomous system (e.g., the system 100). This routing information can then be used to route network-level protocols like Internet Protocol (IP). By contrast, exterior gateway protocols are used to exchange routing information between autonomous systems and rely on IGPs to resolve routes within an autonomous system. IGP can be divided into two categories: distance-vector routing protocols and link-state routing protocols.

Specific examples of IGP protocols include Open Shortest Path First (OSPF), Routing Information Protocol (RIP) and Intermediate System to Intermediate System (IS-IS).

The maximum flow problem and associated algorithm includes finding a feasible flow from a single source to a single destination through a network that is maximal, where the source and the destination are separated by other devices (e.g. satellites 200, gateways 300). The maximum flow problem considers the upper bound capacity between the satellites 200 or gateways 300 to determine the maximum flow. The shortest path problem includes finding a shortest path 22 between the satellites or gateways 300, where the shortest path 22 includes the smallest cost. Shortest path may be defined in terms of physical distance, or in terms of some other quantity or composite score or weight, which is desirable to minimize. Other algorithms may also be used to determine the path 22 of a communication 20.

The algorithms used to determine the path 22 of a communication 20 may include a scoring function for assigning a score or weight value to each link (communication between the satellites 200 or between the satellites 200 and the gateways 300). These scores are considered in the algorithms used. For example, the algorithm may try to minimize the cumulative weight of the path 22 (i.e., sum of the weights of all the links that make up the path 22). In some implementations, the system data processor 110 considers the physical distance (and, closely related, latency) between the satellite 200 or gateway 300, the current link load compared to the capacity of the link between the satellite 200 or gateway 300, the health of the satellite 200 or gateway 300, or its operational status (active or inactive, where active indicates that the device is operational and healthy and inactive where the device is not operational); the battery of the satellite 200 or gateway 300 (e.g., how long will the device have power); and the signal strength at the user terminal (for user terminal-to-satellite link).

Referring back to FIG. 5, the system data processing device 110, 210 may determine multiple paths 22 of the communication 20 as shown, but select one of the paths 22 based on differing factors. For example, the source ground station 310 receives the communication 20 and sends it to the nearest satellite 200aa in a first group 202a, which in turn sends it to a linking-gateway 330a. In other examples, the source ground station 310 sends the communication 20 to a further satellite 200ba within the second group 202b of satellites 200b. Each satellite 200 receiving a communication 20 sends the communication 20 (based on the discussed criteria) to another satellite 200 or linking gateway 330 until the communication reaches its final destination, the end user 10b. As described, the communication 20 hops planes 204 by using the linking-gateway 330.

Figure 6:
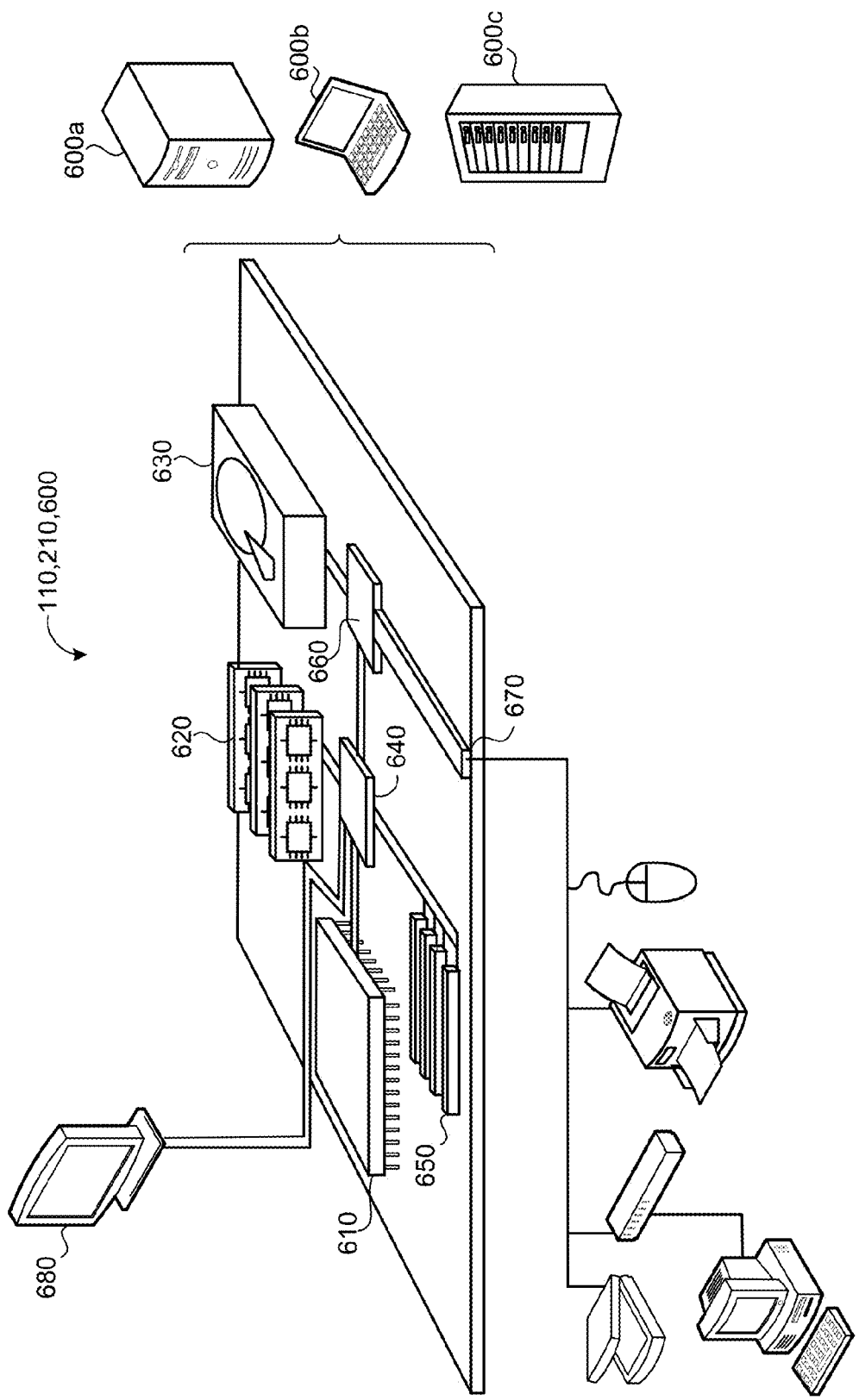
FIG. 6 is a schematic view of an exemplary computing device for implementing the path of a communication between a first and second user.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as a display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown in FIG. 6. For example, it may be implemented as a standard server 600a or multiple times in a group of such servers 600a, as a laptop computer 600b, or as part of a rack server system 600c.

Figure 7:
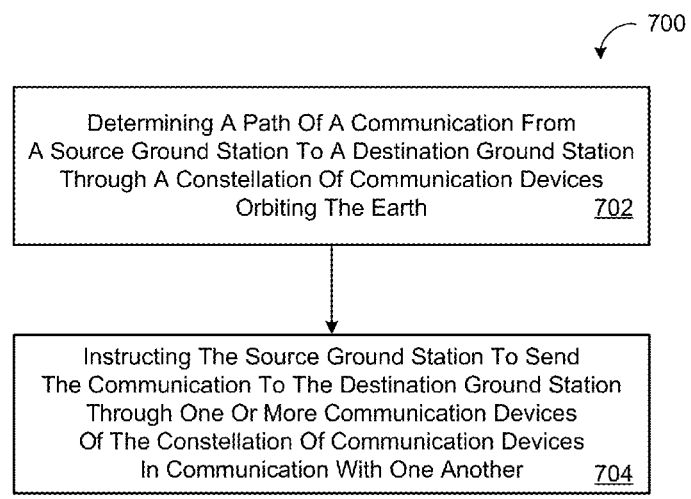
FIG. 7 is a schematic view of an exemplary arrangement of operations for communicating between two users.

FIG. 7 illustrates a method 700 of communication. The method 700 includes determining 702, at a data processing device 110, 210, a routing path 22 of a communication 20 from a source ground station 310 to a destination ground station 320 through a constellation of communication devices orbiting the earth 30. Each communication device 200 (e.g., satellite) has a corresponding orbital path or trajectory 204 with an inclination angle of less than 90 degrees and greater than zero degrees with respect to the equator 40 of the earth 30. The constellation includes a first group 202a of communication devices orbiting at a first altitude $A_1$ from the earth 30 and at a first inclination angle. A second group 202b of communication devices 200 orbits at a second altitude $A_2$ from the earth 30 lower than the first altitude $A_1$ and at a second inclination angle different from the first inclination angle. The method 700 also includes instructing 704, using the data processing device 110, 210, the source ground station 310 to send the communication 20 to the destination ground station 320 through one or more communication devices 200 of the constellation of communication devices 200 in communication with one another.

In some examples, the method 700 includes instructing the source ground station 310 to send the communication to a first communication device in the first group 202a of communication devices and instructing the first communication device in the first group 202a of communication devices to send the communication 20 to a second communication device in the first group 202a of communication devices or a third communication device in the second group 202b of communication devices. In some examples, the communication device includes a satellite 200. The groups 202 of communication devices may provide overlapping coverage of portions of the earth 30.

In some implementations, one group of communication devices 202 orbits the earth 30 at an inclination angle equal to about 60 degrees. Each group 202 of communication devices 200 may include multiple orbital paths or trajectories 204, with each orbital path 204 having multiple communication devices 200 spaced form one another. The communication devices 200 within an orbital path or trajectory 204 may be separated by equal distances $D_1$, $D_2$.

In some examples, the method 700 further includes instructing a current communication device 200 having possession of a communication 20 to send the communication 20 to a forward or rearward communication device within the orbital path or trajectory 204 of the current communication device 200. Determining the routing path 22 of a communication 20 from the source ground station 310 to the destination ground station 320 may include determining the routing path 22 based on at least one of a border gateway protocol, an interior gateway protocol, maximum flow algorithm, or shortest path algorithm. Alternatively, determining the routing path 22 of a communication 20 from the source ground station 310 to the destination ground station 320 may include determining based on a scoring function of one or more of a distance between the source and the destination ground stations 310, 320, a capacity of an inter-satellite link between two devices, and operational status of a communication device, and a signal strength of a communication device.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, this disclosure may be applied to high altitude pseudo-satellites (HAPSs) and/or unmanned aerial vehicles (UAVs) orbiting or moving around the earth in conjunction with or in place of satellites. Accordingly, other implementations are within the scope of the following claims. For example, the actions recited in the claims can be performed in a different order and still achieve desirable results.

What is claimed is:

1. A communication system comprising:
a constellation of communication devices orbiting earth, each communication device having a corresponding orbital path and an inclination angle with respect to the equator of the earth, the constellation comprising:
a first group of communication devices having orbital paths at a first altitude from the earth and at a first inclination angle, each orbital path of the first group of communication devices having multiple communication devices spaced apart from one another; and
a second group of communication devices having orbital paths at a second altitude from the earth lower than the first altitude and at a second inclination angle different from the first inclination angle, each orbital path of the second group of communication devices having multiple communication devices spaced apart from one another; and
at least one linking device separate from and in communication with the constellation of communication devices, the at least one linking device relaying communications between two communication devices that are in a different groups of communication devices and/or in different orbital paths,
wherein the first group of communication devices communicates with the second group of communication devices only by way of the at least one linking device.

2. The communication system of claim 1, wherein a first communication device having a first orbital path communicates with a second communication device having a second orbital path only by way of the at least one linking device.

3. The communication system of claim 2, wherein the first communication device and the second communication device reside in the same group of communication devices or in different groups of communication devices.

4. The communication system of claim 1, wherein the inclination angle of each communication device is less than 90 degrees and greater than zero degrees with respect to the equator of the earth.

5. The communication system of claim 4, wherein the inclination angle of the communication devices of one of the groups of communication devices is about 60 degrees.

6. The communication system of claim 1, wherein the groups of communication devices provide overlapping coverage of portions of the earth.

7. The communication system of claim 1, wherein the communication devices within each orbital path are separated by equal distances.

8. The communication system of claim 1, wherein a current communication device having possession of a communication is in communication with a forward communication device and a rearward communication device, the forward communication device and the rearward communication device within the same orbital path as the current communication device.

9. The communication system of claim 1, further comprising:
a source ground station in communication with the constellation of communication devices;
a destination ground station in communication with the constellation of communication devices; and
a data processing device in communication with the source ground station, the constellation of communication devices, and the destination ground station, the data processing device determining a routing path of a communication from the source ground station to the destination ground station.

10. The communication system of claim 9, wherein the data processing device determines the routing path based on a scoring function of one or more of a distance between the source and the destination, a capacity of an inter-satellite link between two devices, an operational status of a communication device, or a signal strength of a communication device, wherein the operational status of a communication device comprises an active status or an inactive status of the communication device as a whole or one or more individual components of the communication device.

11. A method comprising:
determining, at data processing hardware, a routing path of a communication from a source ground station to a destination ground station through a constellation of communication devices orbiting earth, each communication device having a corresponding orbital path and an inclination angle with respect to the equator of the earth, the constellation comprising:
a first group of communication devices having orbital paths at a first altitude from the earth and at a first inclination angle, each orbital path of the first group of communication devices having multiple communication devices spaced apart from one another; and
a second group of communication devices having orbital paths at a second altitude from the earth lower than the first altitude and at a second inclination angle different from the first inclination angle, each orbital path of the second group of communication devices having multiple communication devices spaced apart from one another; and
instructing, by the data processing hardware, the source ground station to send the communication to the destination ground station along the determined routing path through the constellation of communication devices,
wherein at least one linking device separate from and in communication with the constellation of communication devices relays communications between two communication devices that are in a different groups of communication devices and/or in different orbital paths, and
wherein the first group of communication devices communicates with the second group of communication devices only by way of the at least one linking device.

12. The method of claim 11, wherein a first communication device having a first orbital path communicates with a second communication device having a second orbital path only by way of the at least one linking device.

13. The method of claim 12, wherein the first communication device and the second communication device reside in the same group of communication devices or in different groups of communication devices.

14. The method of claim 11, wherein the inclination angle of each communication device is less than 90 degrees and greater than zero degrees with respect to the equator of the earth.

15. The method of claim 14, wherein the inclination angle of the communication devices of one of the groups of communication devices is about 60 degrees.

16. The method of claim 11, wherein the groups of communication devices provide overlapping coverage of portions of the earth.

17. The method of claim 11, wherein the communication devices within each orbital path are separated by equal distances.

18. The method of claim 11, further comprising:
instructing, by the data processing hardware, the source ground station to send the communication to a first communication device in the first group of communication devices; and
instructing, by the data processing hardware, the first communication device in the first group of communication devices to send the communication to:
a second communication device in the first group of communication devices; or
a third communication device in the second group of communication devices.

19. The method of claim 11, further comprising instructing, by the data processing hardware, a current communication device having possession of a communication to send the communication to a forward communication device or a rearward communication device within the same orbital path of the current communication device.

20. The method of claim 11, wherein determining the routing path of the communication from the source ground station to the destination ground station is based on a scoring function of one or more of a distance between the source ground station and the destination ground station, a capacity of an inter-satellite link between two devices, an operational status of a communication device, or a signal strength of a communication device, wherein the operational status of a communication device comprises an active status or an inactive status of the communication device as a whole or one or more individual components of the communication device.

\* \* \* \* \*